United States Patent [19] [11] 3,755,795
Sordello et al. [45] Aug. 28, 1973

[54] ARRIVAL DETECTION AND DATA TRANSFER CONTROL SYSTEM FOR DATA

[75] Inventors: Frank J. Sordello; Frank D. Ruble, both of San Jose, Calif.

[73] Assignee: Information Storage Systems, Inc., Cupertino, Calif.

[22] Filed: Aug. 23, 1971

[21] Appl. No.: 173,752

[52] U.S. Cl. .......... 340/174.1 C
[51] Int. Cl. .......... G11b 5/56
[58] Field of Search .......... 340/174.1 B, 174.1 C, 340/174.1 G, 174.1 H

[56] References Cited

UNITED STATES PATENTS

| | | | |
|---|---|---|---|
| 3,209,338 | 9/1965 | Romueri | 340/174.1 C |
| 3,399,391 | 8/1966 | Berrosse | 340/174.1 C |
| 3,644,910 | 2/1972 | Smith | 340/174.1 C |

*Primary Examiner*—Vincent P. Canney
*Attorney*—C. Michael Zimmerman

[57] ABSTRACT

A disc pack type of random access memory apparatus is described which includes a system for detecting when a read/write head arrives in the proximity of an addressed track location on a disc under conditions assuring that data can be transferred between the head and the track without data being erroneously transferred to or from adjacent tracks. A differentiator is provided for determining from a head position signal the velocity of the head at a preselected distance from the center of the track. Upon a detector indicating that the head velocity at such preselected distance is equal to or below a value at which the head will not overshoot the track center beyond the range within which data can be safely transferred, the system will direct the start of data transfer between the head and the track even though the head has not yet settled at the track location.

7 Claims, 3 Drawing Figures

ARRIVAL DETECTION AND DATA TRANSFER CONTROL SYSTEM FOR DATA

BACKGROUND OF THE INVENTION

The present invention relates to data memory apparatuses of the type in which a data transfer device, such as a read/write head, and a data storage device, such as a recording disc, are positioned at various discrete locations relative to one another for the transfer of data therebetween. More particularly, the invention relates to an arrival detection and data transfer control system for such a memory apparatus which provides immediate initiation of transfer of data between the transfer device and the storage device upon the transfer device arriving within a selected proximity range of a desired one of such discrete locations under conditions assuring that such transfer device will remain within the proximity range.

As the speed of computers and other data processing units has increased, there has been a strong demand that the speed with which data or information is transferable between data memories and a computer be correspondingly increased. For this reason, direct access memories of the type employing a pack of rotating magnetic discs for recording and storing data are being widely adopted. Memories of this nature have the advantage of enabling information to be either transferred to, or removed from, randomly selected locations or tracks on the disc without the necessity of the memory having to serially "seek" the desired location such as must be done with, for example, magnetic tape memories. To this end, random access disc pack memories relay on movement of read/write heads radially of a disc pack between different radial locations thereon, each one of which correspond with a generally circular track on the disc at which information can be stored.

It will be appreciated that the speed of such disc pack memory apparatus will be largely dependent upon the time required for movement of the read/write heads from one location or track on a recording disc to a newly addressed one. Very responsive position sensing and fast acting position controllers for the read/write heads have therefore been provided in order to reduce the time required for head movement to a minimum. Examples of relatively sophisticated position sensing and positioning systems providing fast movement can be found in commonly owned and copending applications Ser. Nos. 63,508 now abandoned and 172,781, filed respectively Aug. 13, 1970 and Aug. 18, 1971, and entitled respectively "Position Sensor" - Martin, et al., and "Linear Positioning Apparatus for Memory Disc Pack Drive Mechanisms" - Sordello, et al. Systems of this type, as well as other systems now available, can provide movement of the read/write heads at speeds up to 80 inches per second with average head travel distances of as little as ½ inch.

With head velocities of such high value, difficulties arise in attempting to always stop the heads exactly at desired track positions. It is not unusual for read/write heads to "overshoot" a track location beyond the range around the center of a track location within which it is safe to transfer data between the heads and the track with assurance that the data transfer will take place with the desired track rather than adjacent ones. Because of such, it has been the practice in the past to design disc pack recording apparatuses with a built-in delay time between the first arrival of a head at an addressed track location and the initiation of the desired data transfer. The delay gives the heads time to "settle" at the desired location, i.e., correct for any unacceptable overshoot. Such delay time has, for example, either been a fixed arbitrary time selected in light of the parameters of the system or has been a time dependent upon some parameter of the moving mechanism reaching a value indicative of a desired degree of settling. It will be recognized that in light of the relatively little time actually required for movement of the read/write heads between positions, this head settling time plays a significant role in determining the overall average data access time.

SUMMARY OF THE INVENTION

The present invention provides an arrival detection and data transfer control system for a data memory apparatus which enables data transfer between a data transfer device and a data storage device to begin immediately upon arrival of the moveable one of such devices within a preselected proximity range of the desired location with respect to the other, if such arrival is under conditions assuring that the devices will remain within such proximity range relative to one another. To this end, the apparatus of the invention includes means for determining the velocity of approach of the data transfer device to the desired location at a preselected distance therefrom, and means responsive to the velocity at such distance being below a predetermined value assuring that such device will not overshoot the desired location beyond the safe proximity range by directing the initiation of data transfer between the transfer device and the storage device. Most desirably, the means for determining the velocity of one of such members relative to the other is a differentiator which provides the rate of change at any given time of a position signal generated to represent the positioning at such time of one of the devices relative to the other. A comparison of the differentiator output with the state of the position signal indicative of the preselected distance provides the desired information for controlling initiation of data transfer.

BRIEF DESCRIPTION OF THE DRAWING

With reference to the accompanying sheet of drawing.

DETAILED DESCRIPTION OF THE DRAWING

Figure 1:
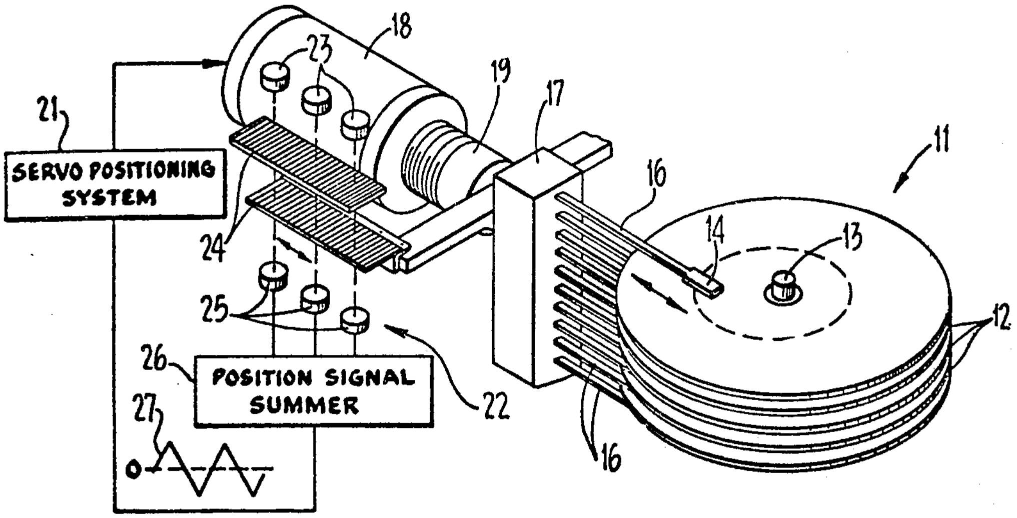
FIG. 1 is a generally schematic and isometric illustration of the functional components of a disc pack memory apparatus to which the invention is particularly applicable.

With reference first to FIG. 1, the major components of a data storage and recording apparatus of the type to which the present invention is particularly applicable are illustrated. Such apparatus includes a data storage device 11 made up by a plurality of coaxial recording discs 12 mounted for rotation on a drive spindle 13. The planar recording surfaces of each disc 12 are coated with a magnetically recordable material to provide the desired data storage.

Associated with each recording surface of a disc is a data transfer device in the form of a read/write head 14. The heads 14 are individually supported by associated cantelevered support arms 16 extending radially of the discs from an upright 17 of a translatable carriage. A position controller, specifically depicted as an electro magnetic actuator 18 having a moving coil 19 thereof secured to upright member 17, is provided to transmit the the heads 14 back and forth relative to the disc surfaces. A servo positioning system, diagramatically indicated by block 21, delivers appropriate control signals to the actuator coil 19 to provide the translational movement of the heads 14 and stop the same at various radial locations with respect to the disc surfaces. The positioning system is desirably of the type described and claimed in commonly owned copending application Ser. No. 792,343, now issued as U.S. Pat. No. 3,597,750 entitled "Apparatus for Maintaining Servo Controlled Member in a Selected Position" - Brunner, et al., filed Jan. 21, 1969. A position sensing mechanism, generally referred to in the drawing by the reference numeral 22, provides the relative position information required by the servo system to properly regulate operation of the position controller. Such sensing system is desirably that described in the previously mentioned copending application Ser. No. 172,781, entitled "Linear Positioning Apparatus for Memory Disc Pack Drive Mechanisms". As disclosed in such application, as well as is shown in FIG. 1 hereof, such system includes a plurality of light sources 23 which cooperate with a pair of grating assembles 24 and optical sensors 25 to generate signals which are delivered to a summing circuit arrangement, schematically represented by block 26. The summing circuit develops at its output a triangular position control signal which is depicted at 27 and whose null points, i.e., points at which its polarity changes, represent the track locations at which the servo positioning system is capable of commanding the actuator to position the heads relative to the discs.

As previously mentioned, the heads 14 are moved between track positions on the discs at quite high velocities. Because of such velocities, as well as for other reasons, it is not unusual for the position controller to translate the heads beyond the location of an addressed track. However, it is only within a certain distance proximity of the center of the track location within which data can be transferred between the heads and the track with assurance that the data transfer will be between the head and the correct track without interference from adjacent tracks. Thus, it has been the practice in the past to wait for a period of time after arrival of the heads at a desired location before beginning the transfer of data. This time added to assure that the head has settled at the desired track location makes a significant contribution to the average data access time of the memory.

Figure 2:
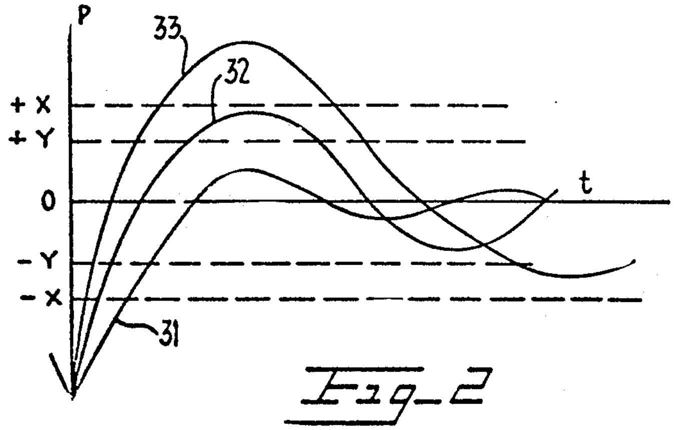
FIG. 2 is a graphic representation of several different arrivals of a data transfer device with respect to a desired storage device location.

FIG. 2 is a graphical representation of the arrival of a head 14 at a track location under different conditions. The abscissa of the graph represents time on a uniform scale and the ordinate represents head position relative to a desired track location. The center of the track location is represented by the abscissa crossovers.

The horizontal lines at $\pm x$ represent the boundaries on each side of the center of the track of that area around the track within which it is safe to have data transferred between the head and the recording surface. That is, the $\pm x$ lines define the proximity range within which data can be transferred between the head and a track with assurance that there will be no incorrect data transfer between the head and adjacent tracks.

The three graph lines 31, 32, and 33 are respectively plots of three different approaches of a head to an addressed track location represented by the abscissa line. It will be appreciated that the differential or slope of each line at any point thereon represents the velocity at the particular point location of the head approach represented by the line.

Graph line 31 is a general positional plot of an average arrival of a head at a track location. As is illustrated, while the head does overshoot the center of the track location, it stays well within the proximity range defined by the $\pm X$ lines as it settles centrally of the track. The graph line 32 is a positional plot of a head as it arrives at the track location at a greater velocity than that of the average arrival represented by line 31. It will be seen that the greater arrival velocity, represented by the slope of plot 32, causes the head to considerably overshoot the center of the track. However, upon once arriving within the proximity range in which it is safe to transfer data at the track location, the head remains in such proximity range, even though a longer time is required for the head to settle on the track center to the same degree as a head following the average arrival plot.

It will be appreciated that insofar as heads arriving at a track under conditions represented by the plot lines 31 and 32 are concerned, it would be possible for the transfer of data between the heads and the track to be initiated as soon as such heads first arrive into the proximity range defined by the $\pm$ X lines. However, disc pack recording apparatus have not, until now, been designed to initiate data transfer at such time in view of the possibility of head arrivals at a track location under conditions represented by the plot line 33. As can be seen, the head arrives in the vicinity of the track location at such a velocity that the servo system is unable to reverse its direction until after the head has passed beyond the + X boundary line of the safe proximity range. Thus, if data transfer had been initiated upon the head first arriving within the proximity range, i.e., the positional plot line crossing the − X line, a portion of such data might well have been erroneously transferred between the head and an adjacent one of the track locations. It is primarily in light of head arrivals as represented by plot line 33 that the time delay discussed above is necessary.

The present invention provides means enabling the initiation of the transfer of data once a head has first arrived within the proximity range as long as the head arrives with a velocity assuring that it will remain within the proximity range. That is, the invention enables the data transfer process to begin immediately upon a determination that the head has arrived at the desired track under conditions represented by plots 31 and 32. However, it will not initiate data transfer when a head first arrives at the track under conditions represented by plot line 33, but rather will initiate data transfer only when the head reenters the proximity range under conditions assuring that it will remain in the range. The invention accomplishes this in the preferred embodiment by determining the velocity of the head at a preselected distance from the track center or optimum location. It determines such velocity from the position signal 27 emanating from position signal summer 26. Upon such velocity relative to the positioning of the head being equal to or less than an upper velocity limit over which the head would overshoot the track location beyond the proximity range, a signal is generated to initiate the data transfer process.

Figure 3:
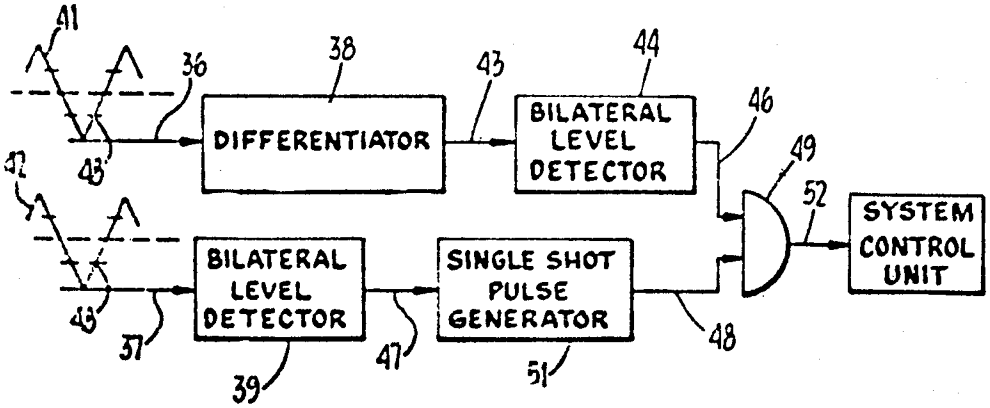
FIG. 3 is an electrical block diagram of a preferred embodiment of an arrival detection and data transfer control system of the invention.

The preselected distance from the center track at which the velocity is sampled is most desirably within the proximity range. The horizontal lines indicated by the " Y lines on each side of the abscissa in FIG. 2 represent such a preselected distance. FIG. 3 illustrates a preferred arrangement for determining from signal 27 the head velocity at such distance and providing the desired indication of data transfer as appropriate. With reference to such figures, the position signal 27 is applied to input lines 36 and 37 of a differentiator 38 and a bilateral level detector 39, respectively. Such position signal, as it appears on the input lines, is graphically represented at both 41 and 42. The differentiator 38 can be, for example, an operational amplifier which continuously determines the time rate of change of the signal 41. Its output is directed via line 43 to a bilateral level detector 44. Such level detector is set to generate an output signal on line 46 upon the rate of change of the signal 41, i.e., the velocity of the heads, being equal to or less than a level representative of the upper velocity limit.

The bilateral level detector 39 into which the position signal is directly fed via line 37 is set to initiate an output signal upon such position signal reaching a state representative of the preselected distance defined by, for example, the −Y line in FIG. 2. Such state of the position signal responsible for the generation of the output is represented at 48 in the graphical representation 42 of the position signal. The output from the bilateral level detector in line 47 is directed to a single shot pulse generator 51, such as a monostable multivibrator, which is responsive to the initiation of output from the bilateral level detector 39 by forming a short time duration pulse on output line 48.

The output line 46 from the bilateral level detector 44 in the velocity determination branch of the system is connected to one input terminal of a double input AND gate 49, whereas the output signal 48 from the single shot pulse generator of the preselected distance determination branch of the system, is connected to the other input terminal thereof. AND gate 49 only generates an output signal on line 52 upon the receipt of input from both line 46 and line 48. Thus, it is only operative to provide an output signal if at the time it receives an input pulse from the single shot pulse generator representative of the passing of the head by the preselected distance, it is also receiving an input pulse from line 46 indicating that the velocity is equal to or below the upper velocity limit. The output from the AND gate on line 52 is directed to the system control unit of the unit to immediately initiate data transfer upon the simultaneous receipt by the AND gate of signals from both lines 46 and 48.

With reference again to FIG. 2, it will thus be seen that upon a head crossing the − Y horizontal line with velocities as represented by the plot lines 31 and 32, the transfer of data between the head and the track will begin immediately without settling time being required and even before the head actually arrives at the center track location represented by the abscissa line. However, upon a head crossing the − Y line with a velocity as represented by the plot line 33, i.e., a velocity greater than that represented by a level to which the level detector 44 responds, there will not be an output signal from the same to activate the AND gate when it receives the input pulse indicating that the head has crossed the − Y line. Thus, data transfer will not be initiated. However, upon the head reentering the proximity range and again coming within the preselected distance as represented by the + Y horizontal line, the single shot pulse generator will again provide an output pulse on line 48 in order to activate the AND gate if at such time the velocity of the head has slowed to such a point to be below the upper velocity limit so that the bilateral level detector is providing output on line 46. It will be seen that the path represented by the plot line 33 is one in which the head only overshoots the proximity range on its first arrival, i.e., its velocity at the + Y line is such that it will not overshoot beyond the − X line. Thus, data transfer will be initiated upon the line reentering the proximity range and crossing the + Y line. In this connection, because the detectors 39 and 44 are bilateral, they provide detection of the desired level irrespective of the polarity thereof and irrespective of the direction of travel of the heads toward the desired track location.

It should be noted that it is desirable to utilize the system of the present invention in combination with a conventional time delay data transfer initiator so that if for some reason, the arrival conditions required by the instant invention do not occur, back-up data initiation is available.

While the invention has been described in connection with a preferred embodiment thereof, it will be appreciated by those skilled in the art that various changes and modifications can be made without departing from its spirit. It is therefore intended that the coverage afforded applicant be limited only by the claims.

We claim:

1. In a data memory apparatus of the type in which a data transfer device and a data storage device are positioned at various discrete locations relative to one another for the transfer of data therebetween, an arrival detection and data transfer control system for immediately initiating the transfer of data between said transfer device and said storage device upon said transfer device arriving within a selected proximity range around one of said locations under conditions by which said transfer device will remain within said proximity range for said transference of data, said system comprising means for determining the velocity of said data transfer device relative to said storage device at a preselected distance from said discrete location, and means responsive to a determination that said velocity is equal to or less than a predetermined upper velocity limit relative to said preselected distance over which limit said data transfer device will overshoot said discrete location and distance extending beyond the boundaries of said proximity range for directing the initiation of data transfer between said transfer device and said storage device.

2. The data memory apparatus of claim 1 wherein means are included for generating a position signal representative at any given time of the position of said data transfer device with respect to said data storage device, and said means for determining the velocity of said data transfer device at said preselected distance includes differentiator means for determining the velocity of said signal at a state thereof representative of said preselected distance.

3. The data memory apparatus of claim 2 wherein said means for determining the velocity of said data transfer device relative to said storage device at a preselected distance from said discrete location includes a pair of level detectors, a first one of which is responsive to said positioning signal reaching said state representative of said preselected distance by generating a first output signal and a second one of which generates a second output signal upon the velocity of said position signal at said state being equal to or less than a level representative of said upper velocity limit.

4. The data memory apparatus of claim 3 wherein said position signal is a cyclical signal having slopes of opposite polarity at succeeding states thereof representative of said preselected distance from succeeding ones of said discrete locations, and each of said detectors is a bilateral level detector for providing detection of said velocities and said preselected distance irrespective of the polarity of the particular one of the states of said position signal representative thereof.

5. The data memory apparatus of claim 3 wherein said means responsive to a determination that said velocity is below a predetermined value relative to said preselected distance includes an AND gate to which the output signals of both of said detectors are directed.

6. The data memory apparatus of claim 5 wherein the output signal of said first level detector responsive to said position signal reaching the state thereof representative of said preselected distance is directed to means for forming a short time duration pulse in response to said level detector indicating said state, said pulse being directed to said AND gate for operating the same in conjunction with the output signal of said second level detector to produce a data transfer initiation signal.

7. The data memory apparatus of claim 6 wherein said position signal is a cyclical signal having slopes of opposite polarity at succeeding states thereof representative of said preselected distance from succeeding ones of said discrete locations, and each of said detectors is a bilateral level detector for providing detection of said velocities and said preselected distances irrespective of the polarity of the particular one of the states of said position signal representative thereof.

* * * * *